United States Patent
Lee et al.

(10) Patent No.: US 8,553,078 B2
(45) Date of Patent: Oct. 8, 2013

(54) MEDIA DISPLAY SYSTEM AND ADJUSTMENT METHOD THEREFOR

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 476 days.

(21) Appl. No.: 12/823,330

(22) Filed: Jun. 25, 2010

(65) Prior Publication Data

US 2011/0261181 A1    Oct. 27, 2011

(51) Int. Cl.
*H04N 9/47* (2006.01)

(52) U.S. Cl.
USPC .......................................................... 348/77

(58) Field of Classification Search
USPC .............. 348/51–60, 77, 825–831; 382/115, 382/117, 118
See application file for complete search history.

(56) References Cited

U.S. PATENT DOCUMENTS

| | | | | |
|---|---|---|---|---|
| 6,131,874 | A | * | 10/2000 | Vance et al. .................. 248/550 |
| 2006/0183544 | A1 | * | 8/2006 | Okada ............................. 463/31 |
| 2008/0137918 | A1 | * | 6/2008 | Eura et al. ..................... 382/118 |

FOREIGN PATENT DOCUMENTS

| | | |
|---|---|---|
| CN | 2468356 Y | 1/2002 |
| CN | 101488030 A | 7/2009 |

OTHER PUBLICATIONS

Wang et al., A novel method of eye features location based on face detection, Journal of Fuyang Teachers College (Natural Science), Mar. 2010, pp. 37-39, vol. 27, No. 1, China, See Abstract.

* cited by examiner

*Primary Examiner* — Mehrdad Dastouri
*Assistant Examiner* — Jared Walker
(74) *Attorney, Agent, or Firm* — Altis & Wispro Law Group, Inc.

(57) ABSTRACT

An adjustment method for a media display system includes a camera capturing an image of a viewer, detecting a reference eyeline in the image, obtaining a midline of the image, comparing the reference eyeline with the midline to determine whether the two lines overlap and outputting a comparison signal correspondingly, and driving a driving apparatus according to the comparison signal to adjust height of an electronic billboard.

6 Claims, 8 Drawing Sheets

MEDIA DISPLAY SYSTEM AND ADJUSTMENT METHOD THEREFOR

BACKGROUND

1. Technical Field

The present disclosure relates to a media display system and an adjustment method for the media display system.

2. Description of Related Art

Outdoor media, such as electronic billboards, provide advertising and information to the public. Most of these electronic billboards are mounted at a fixed height. Viewing of the display may be uncomfortable or difficult for those whose eyeline is outside the intended viewing angle of the electronic billboard.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 6:
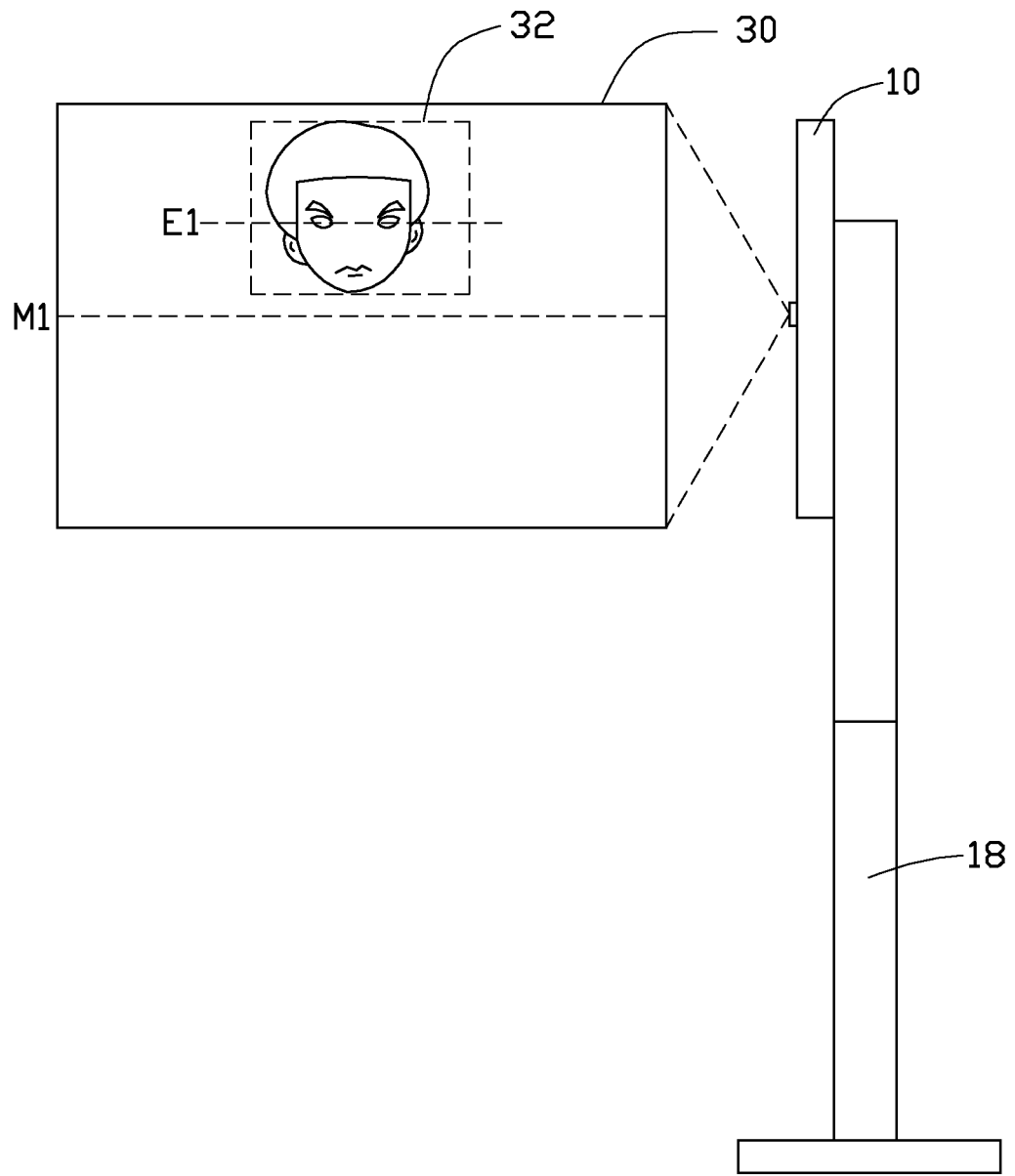
FIGS. 6 and 7 are schematic views showing adjusting the media display system of FIG. 1.

Referring to FIGS. 1 to 4, an exemplary embodiment of a media display system 1 includes an electronic billboard 10, two cameras 12, a storage unit 15, a processing unit 17, a pair of driving apparatus 16, and a bracket 18. The media display system 1 can adjust a height of the electronic billboard 10. Referring to FIG. 6, in the embodiment, it is assumed that when a viewer's eyeline is aligned with a midline of the electronic billboard 10, viewability is optimized. In other embodiments, the relationship between the electronic billboard 10 and the viewer can be preset.

The cameras 12 are mounted on a left side and a right side of the horizontally extended midline (the midline) of the electronic billboard 10, respectively, to capture images 30 of the viewer. The processing unit 17 and the storage unit 15 process the images 30 captured by the cameras 12 to determine a reference eyeline E1 in the images 30 and a midline M1 of the images 30. The processing unit 17 and the storage unit 15 further control the driving apparatus 16 to adjust the height of the electronic billboard 10 to synchronize the reference eyeline E1 and the midline M1 of the images 30. In other embodiments, there may be only one camera 12 mounted on the left side or the right side of the midline of the electronic billboard 10.

In the embodiment, the bracket 18 has a Y-shaped configuration and includes a pair of vertical arms 181. Each of the arms 181 defines a receiving space, and a vertical slot defined in a first sidewall of the arms 181 communicates with the receiving space. Each driving apparatus 16 includes a motor 160 attached to a rear of the billboard 10, a gear 161 attached to a rotor of the motor 160, and a track 162 formed on an inside of a second sidewall of the arm 181 perpendicular to the first sidewall. The gear 161 is received in the receiving space of the bracket 18 to engage the track 162 and the rotor of the motor 160 extends through the slot of the bracket 10. In addition, a motion sensor (such as, for example, a G sensor) 13 is mounted to the electronic billboard 10 to determine whether the electronic billboard 10 moves when the driving apparatus 16 operates.

Figure 1:
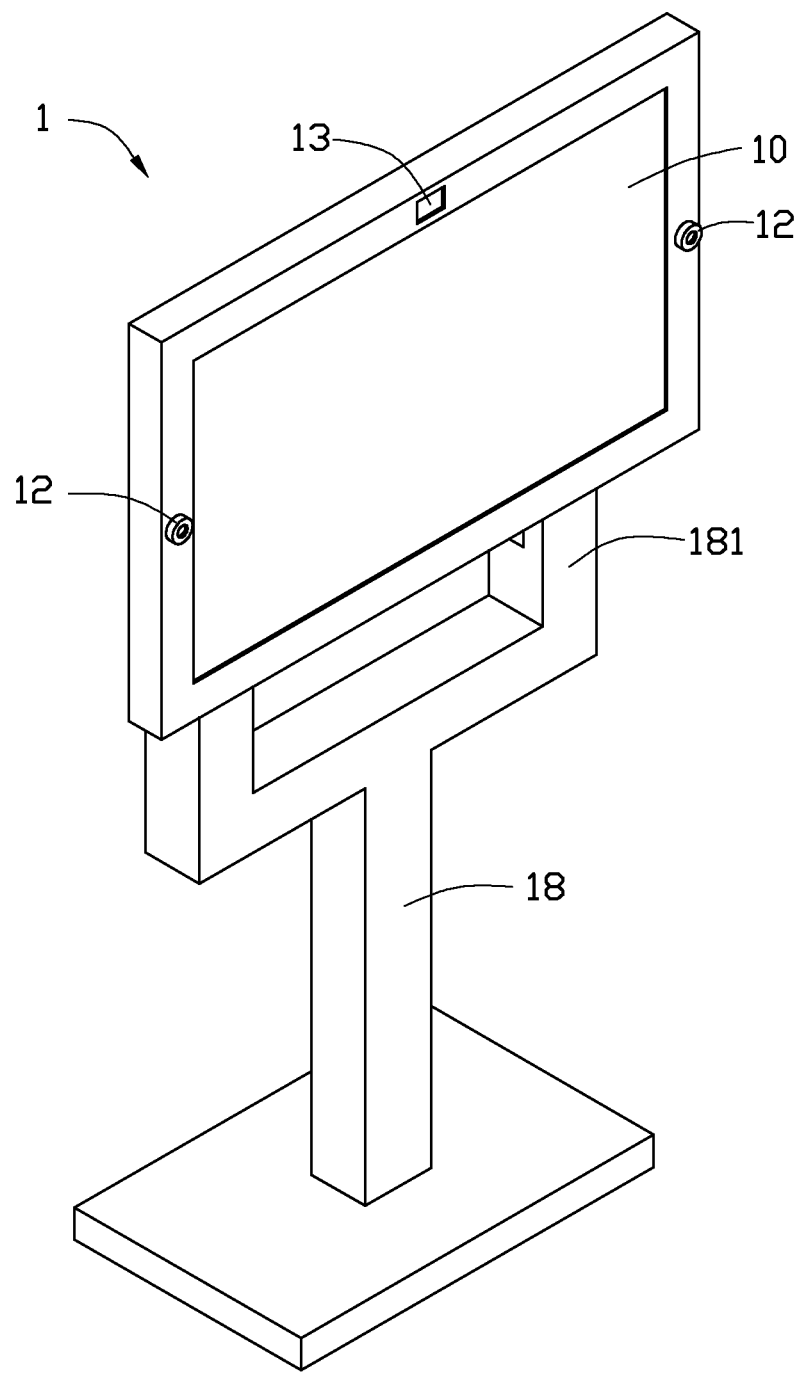
FIG. 1 is an isometric view of an exemplary embodiment of a media display system with a driving apparatus.
Figure 2:
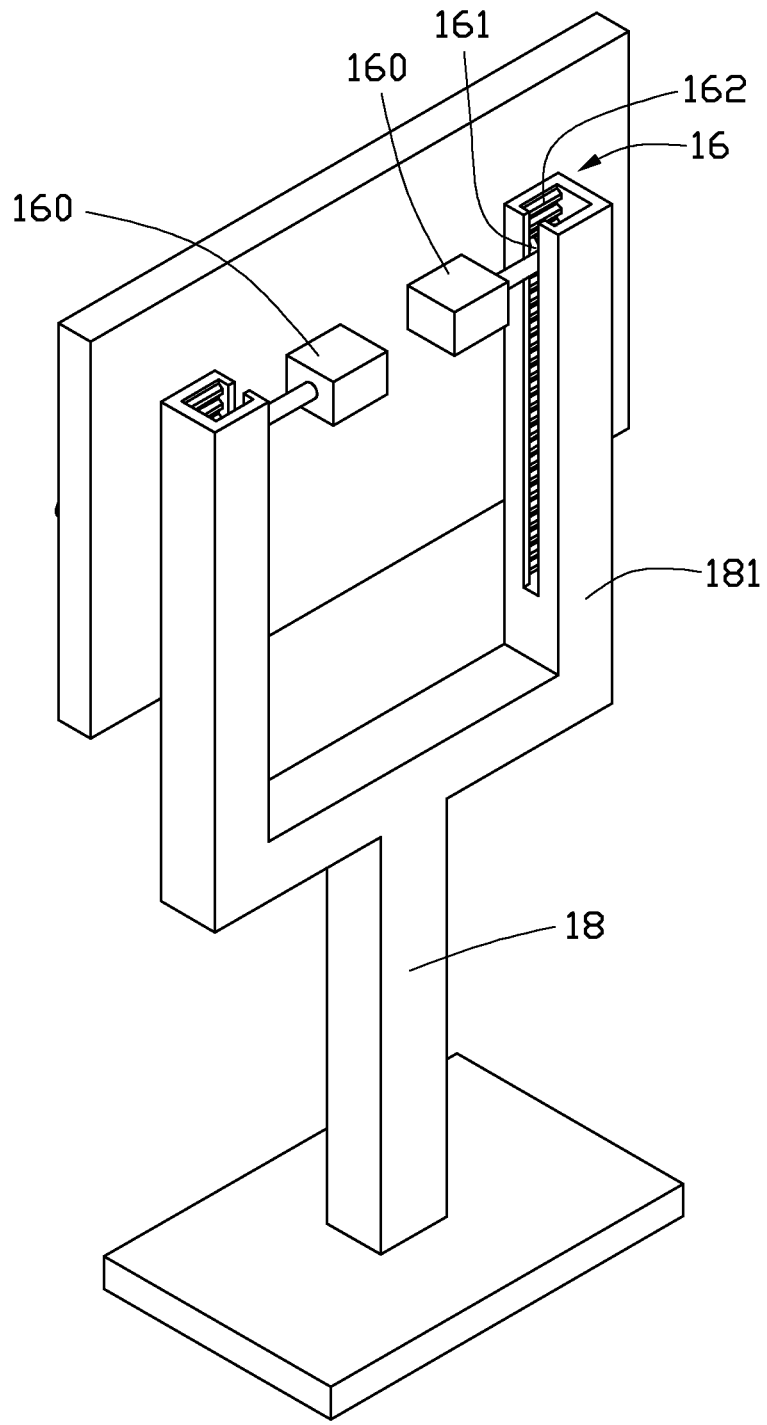
FIG. 2 is similar to FIG. 1, but viewed from another perspective.
Figure 3:
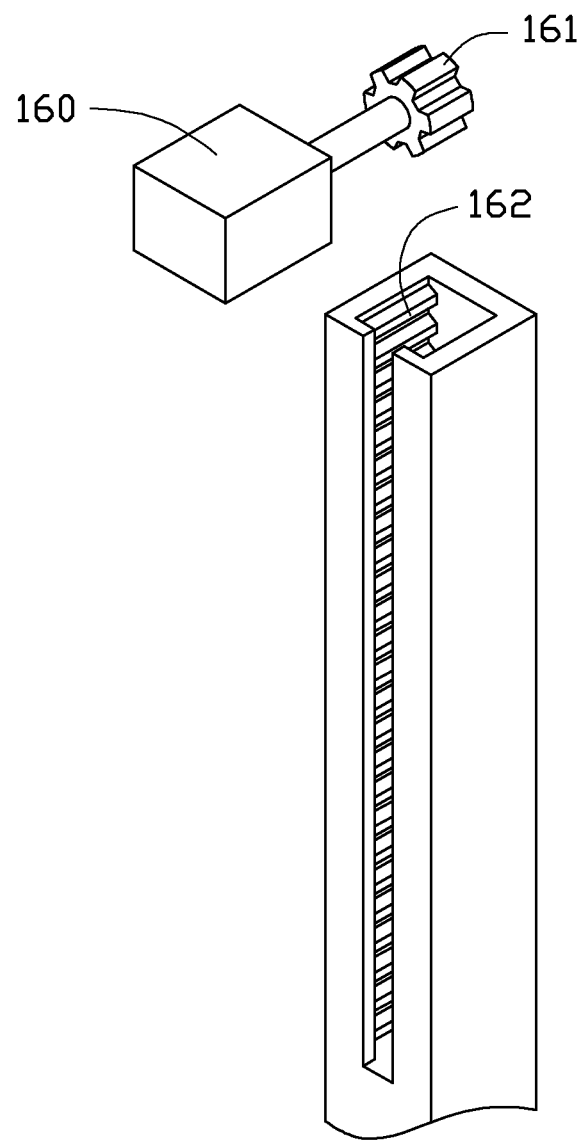
FIG. 3 is an explored, isometric view of the driving apparatus of FIG. 1.
Figure 4:
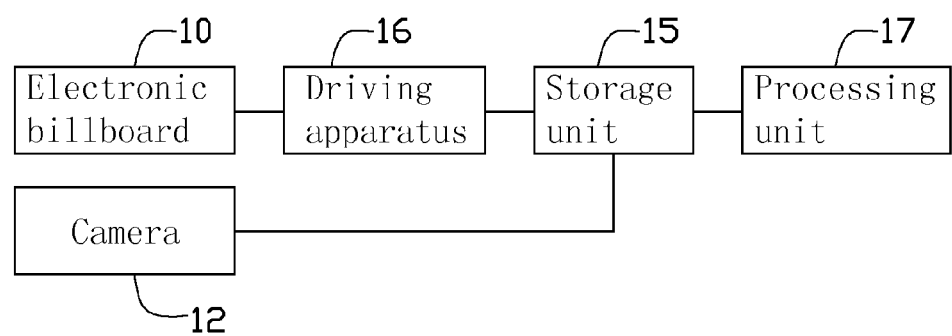
FIG. 4 is a block diagram of the media display system with a storage unit.
Figure 5:
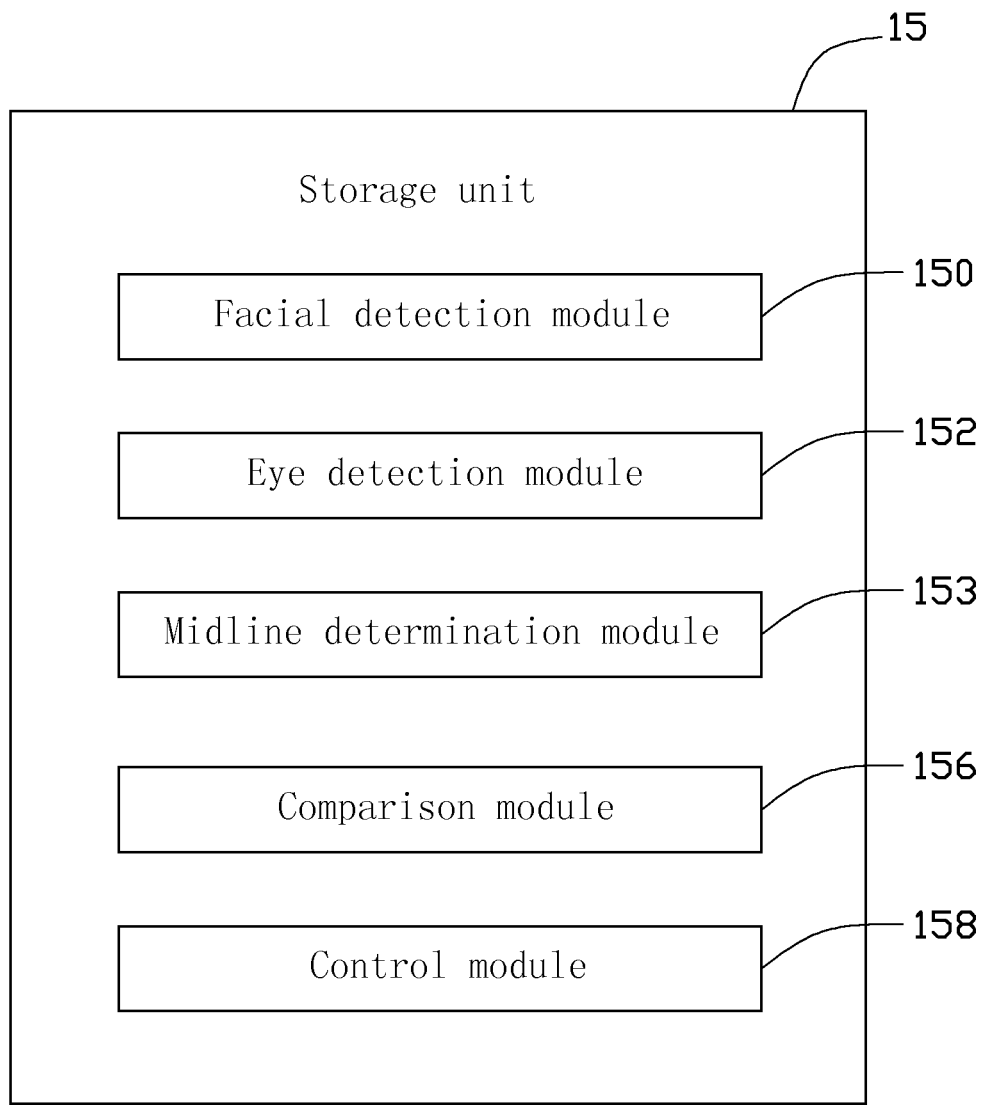
FIG. 5 is a block diagram of the storage unit of FIG. 4.

Referring to FIG. 5, the storage unit 15 includes a facial detection module 150, an eye detection module 152, a midline determination module 153, a comparison module 156 and a control module 158, which may include one or more computerized instructions executed by the processing unit 17.

The facial detection module 150 detects the face region 32 in the images 30 captured by the cameras 12. It is noteworthy that the facial detection module 150 uses well known facial recognition technology to detect a face region in an image.

The eye detection module 152 detects the reference eyeline E1 of the eye in the face region 32 of the image 30. It is noteworthy that the eye detection module 152 uses well known recognition technology to detect an eye region in a face region. In other embodiment, the eye detection module 152 can be omitted. A top one-third of the face region 32 is regarded as the reference eyeline E1.

The midline determination module 155 obtains the midline M1 of the image 30. The comparison module 156 compares the midline M1 and the reference eyeline E1 of the face region 32 in the image 30, and outputs a corresponding comparison signal to the control module 158. The control module 158 directs the driving apparatus 16 to adjust the height of the electronic billboard 10.

Referring to FIG. 6, the camera 12 captures an image 30 of the viewer. In the embodiment, in the image 30, other portions, such as the shoulder and neck, are cropped.

The facial detection module 150 detects the face region 32 in the image 30. The eye detection module 152 detects the reference eyeline E1 in the face region 32. The midline determination module 155 obtains the midline M1 of the image 30. The comparison module 156 compares the midline M1 of the image 30 with the reference eyeline E1 in the face region 32 to determine that the reference eyeline E1 of the face region 32 is misaligned with the midline M1 of the image 30, and outputs a corresponding comparison signal to the control module 158.

The control module 158 directs the driving apparatus 16 to move the electronic billboard 10 up a distance, such as two centimeters. Conversely, if the reference eyeline E1 of the face region 32 in the image 30 is lower than the midline M1 of the image 30, the control module 158 directs the driving apparatus 16 to move the electronic billboard 10 down a distance, such as one centimeter. Repeating these actions, referring to FIG. 7, to overlap the midline M1 of the image 30 with the reference eyeline E1. Then, the control module 158 stops the driving apparatus 16

Figure 7:
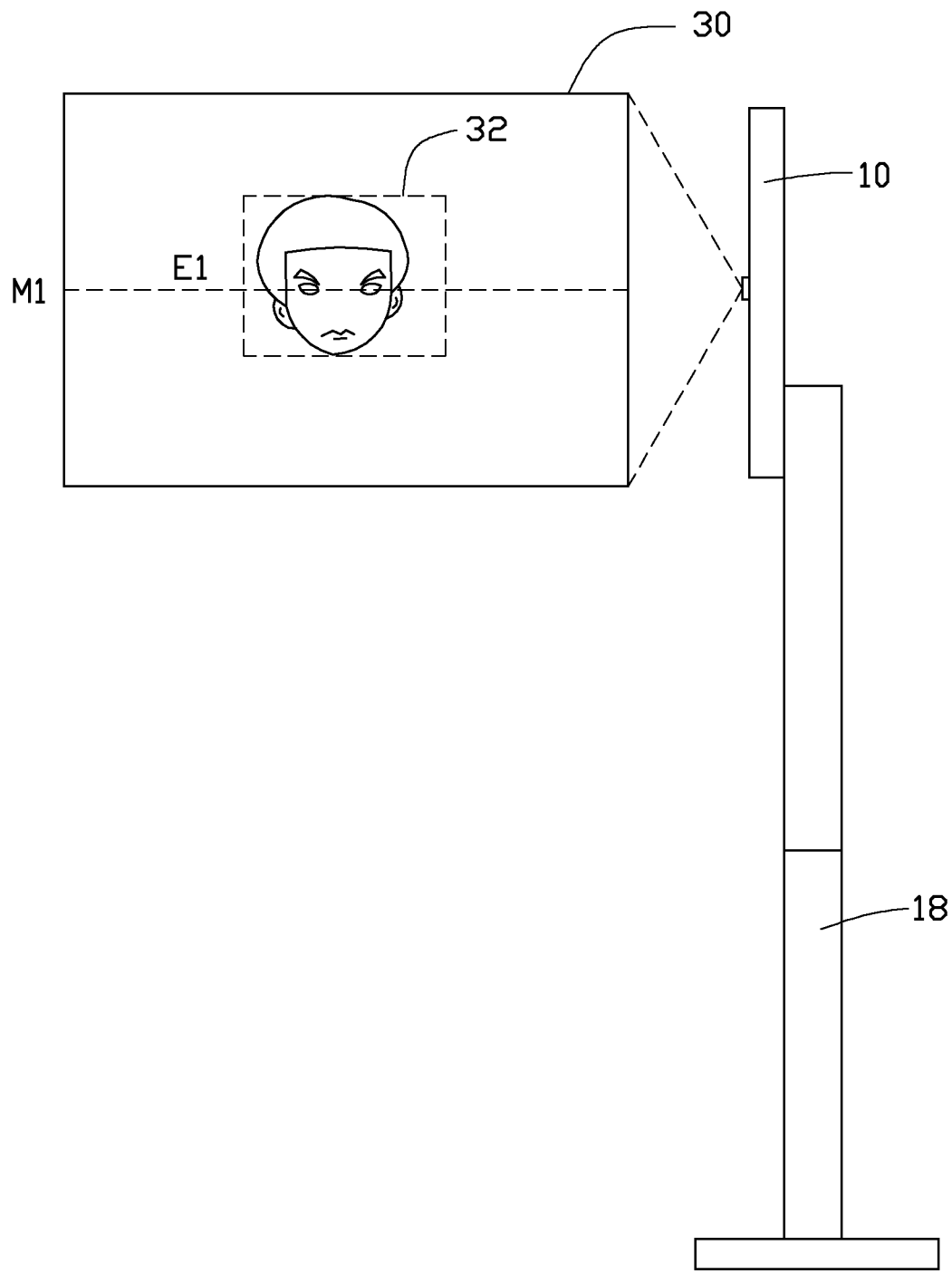

When the camera 12 is mounted on the midline of the electronic billboard 10, the midline of the electronic board 10 is in alignment with the midline M1 of the image 30. Referring to FIG. 7, when the reference eyeline E1 of the face region 32 is in alignment with the midline M1 of the image 30, the viewer can comfortably view the electronic billboard 10.

In the embodiment described above, there is only one viewer. In other embodiments, if there is more than one viewer, the facial detection module 150 detects the images to locate a plurality of face regions in the images. The eye detection module 152 detects the face regions to locate a reference eyeline in each face region, and obtains an average location of the plurality of eye regions. The comparison module 156 compares the average reference eyeline of the eye regions with the midline M1 of the image 30.

Figure 8:
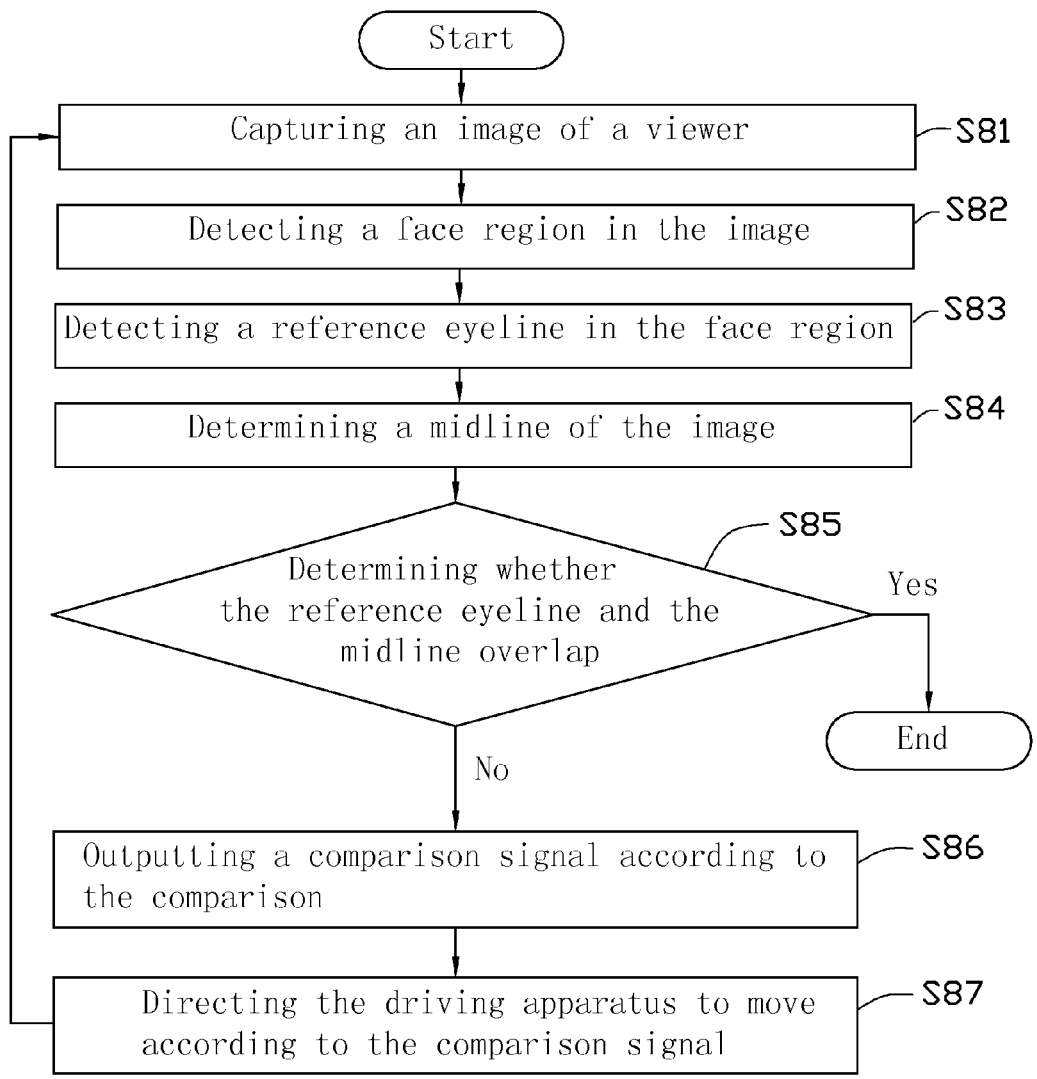
FIG. 8 is a flowchart of an exemplary embodiment of an adjustment method for a media display system, according to an embodiment.

FIG. 8 shows an adjustment method for an electronic billboard 10 as follows.

In step S81, a camera 12 captures an image 30 of a viewer.

In step S82, a facial detection module 150 detects a face region 32 in the image 30.

In step S83, an eye detection module 152 detects a reference eyeline in the face region 32.

In step S84, a midline determination module 153 determines the midline M1 of the image 30.

In step S85, a comparison module 156 compares the reference eyeline E1 with the midline M1 of the image 30 to determine whether the reference eyeline E1 and the midline M1 overlap. Once the reference eyeline E1 and the midline M1 overlap, the viewer can comfortably view the contents on the electronic billboard 10. If the reference eyeline E1 and the midline M1 are not overlapped, step S86 is implemented.

In step S86, the comparison module 156 outputs a comparison signal according to the comparison.

In step S87, the control module 158 directs the driving apparatus 16 to move according to the comparison signal, and step S81 is repeated.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A media display system comprising:
   an electronic billboard attached to a bracket;
   a camera mounted on a midline in height of the electronic billboard, to capture an image of a viewer;
   a driving apparatus to adjust a position of the electronic billboard relative to the bracket for changing a height of the electronic billboard;
   a processing unit; and
   a storage unit connected to the processing unit, the camera, and the driving apparatus, and storing a plurality of programs to be executed by the processing unit, wherein the storage unit comprises:
      a facial detecting module to detect a face region in the image;
      a midline determination module to obtain a midline of the image;
      a comparison module to compare a reference eyeline of the face region with the midline of the image to determine whether the reference eyeline of the face region and the midline of the image overlap, and output a comparison signal correspondingly; and
      a control module to control the driving apparatus to move the billboard according to the comparison signal;
   wherein the reference eyeline is a horizontal line passing through two eyes in the face region, the midline of the image is parallel to the reference eyeline; in response to the reference eyeline being higher than the midline of the image, the control module directs the driving apparatus to move the electronic billboard up; in response to the reference eyeline being lower than the midline of the image, the control module directs the driving apparatus to move the electronic billboard down; and in response to the reference eyeline and the midline of the image overlapping, the control module stops the driving apparatus, and the viewer can comfortably view the electronic billboard.

2. The media display system of claim 1, wherein a top one-third of the face region is regarded as the reference eyeline.

3. The media display system of claim 1, wherein the storage unit further comprises an eye detection module to obtain the reference eyeline in the face region.

4. The media display system of claim 1, wherein the driving apparatus comprises a motor attached to the rear side of the billboard, a gear attached to a rotor of the motor, and a track vertically formed in the bracket, wherein the gear meshes with the track to adjust a height of the electronic billboard.

5. An adjustment method for a media display system comprising:
   capturing an image of a viewer by a camera;
   detecting a reference eyeline in the image, wherein the reference eyeline is a horizontal line passing through two eyes in the image;
   obtaining a midline of the image, wherein the midline of the image is parallel to the reference eyeline;
   comparing the reference eyeline with the midline of the image to determine whether the reference eyeline and the midline overlap, and output a comparison signal correspondingly; and
   directing a driving apparatus to move an electronic billboard according to the comparison signal to adjust a height of the electronic billboard;
   directing the driving apparatus to move the electronic billboard up, in response to the reference eyeline being higher than the midline of the image;
   directing the driving apparatus to move the electronic billboard down, in response to the reference eyeline being lower than the midline of the image; and
   stopping the driving apparatus, in response to the reference eyeline and the midline of the image overlapping.

6. The adjustment method of claim 5, further comprising, between capturing an image of the viewer and detection of the reference eyeline in the image:
   detecting a face region in the image, wherein a top one-third of the face region in the image is regarded as the reference eyeline.

\* \* \* \* \*